March 27, 1934.  K. SAWADA  1,952,945
SOLAR RAY THERAPEUTIC APPARATUS
Original Filed Aug. 29, 1927   2 Sheets-Sheet 1
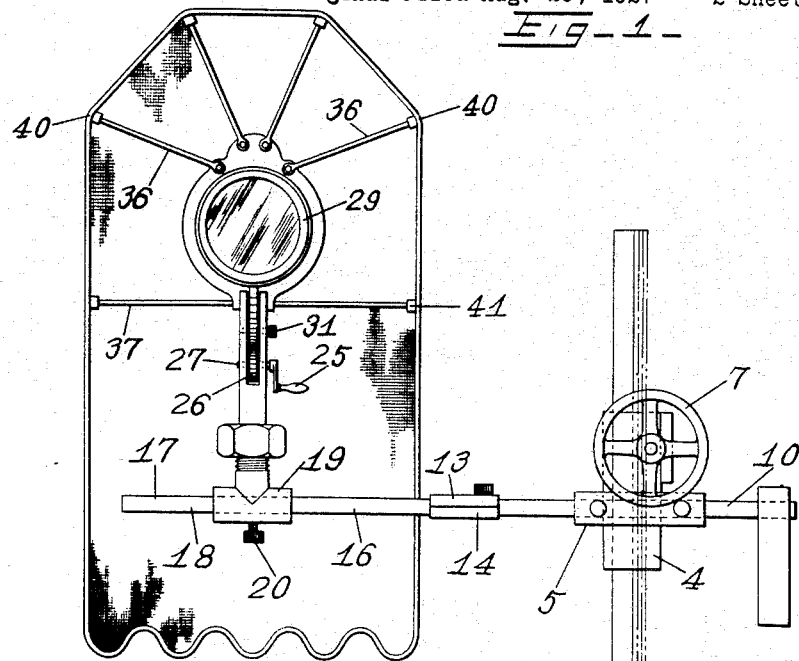
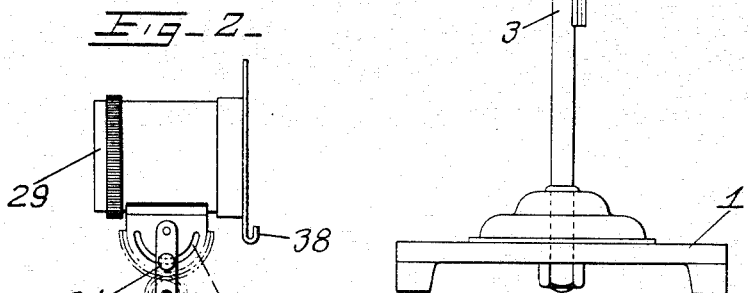
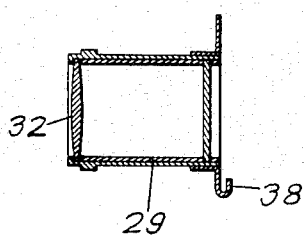
Inventor
Kinnosuke Sawada
by Chas. J. Williamson
Attorney March 27, 1934.　　　　K. SAWADA　　　　1,952,945
SOLAR RAY THERAPEUTIC APPARATUS
Original Filed Aug. 29, 1927　　2 Sheets-Sheet 2
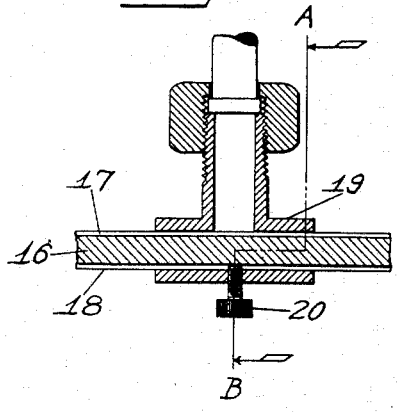
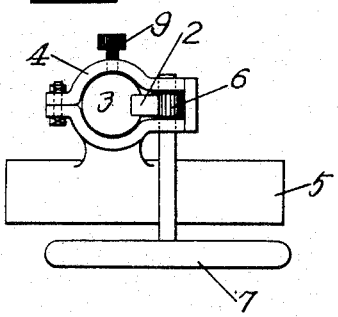
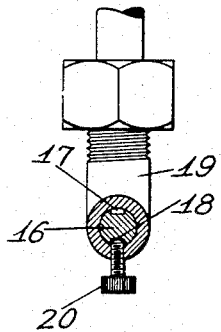
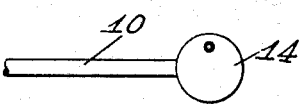
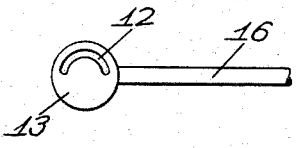
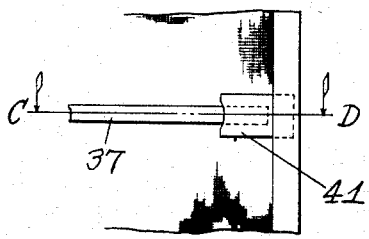
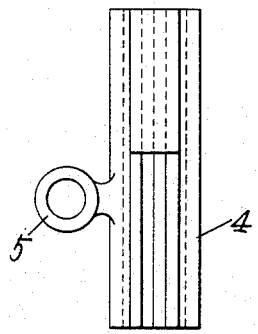
Inventor
Kinnosuke Sawada,
by Chas. J. Williamson
attorney.

1,952,945

UNITED STATES PATENT OFFICE 1,952,945

SOLAR RAY THERAPEUTIC APPARATUS

Kinnosuke Sawada, Osaka, Japan

Application August 29, 1927, Serial No. 216,105
Renewed August 29, 1933

3 Claims. (Cl. 174—177)

The invention relates to a novel type of therapeutic apparatus for isolating the chemical rays from sunlight. The object of the invention is to provide a ready and effective means for utilizing the chemical rays in therapeutics.

It has long since been well known that sunlight plays a most prominent part in the health of human beings, especially from a sanitary point of view. It is also well known that the chemical rays have a wonderful healing effect for skin diseases (tumours, syphiloma etc.), diseases of micro-organic origin (pleurisy etc.), spinal diseases and caries, inflammation of joints, rheumatism, etc., etc.

The invention consists essentially of a tube fitted on one end with a convex lens and on the other end with a filter-screen. The object of the lens is to concentrate the rays so as to intensify their effect, the object of the filter-screen being to absorb the heat rays.

In the accompanying drawings:

Fig. 1 represents the front view of the whole apparatus,

Fig. 2 the side elevation of the part supporting the lens tube,

Fig. 3 the side elevation of a longitudinal section of part of the same,

Fig. 4 the front view of the filter-screen,

Fig. 5 the front view of a partial longitudinal section of the supporting frame, Fig. 6 the side elevation of a longitudinal section through line A—B of Fig. 5, Fig. 7 the plan of the movable frame, Fig. 8 a partial side elevation of the same, Figs. 9 and 10 a plan showing one end of the sliding bar, Fig. 11 a partial front view of the screen cloth, and Fig. 12 a plan of a horizontal section through line C—D of Fig. 11.

Like reference numerals in the drawings denote similar or corresponding parts.

To the base 1 is secured the vertical frame bar 3 carrying on one side a rack 2 and a movable frame 4 forming a body with a tubular lateral frame 5 is fixed to the frame 3. The movable frame 4 carries a pinion 6 engaging with the rack 2 and on the outer end supports an axis fitted with a handle 7, so that by turning the handle the movable frame can be made to slide up and down against the frame bar 3. By means of a set screw 9 attached to the movable frame the position of the latter can be secured in respect to the frame bar.

To the lateral frame 5 is fixed a sliding bar 10 which carries a balance weight on one end and a disc 14 on the other. On the disc 14 fitted with a set screw another disc 13 of the same size is set, the set screw being allowed to pass through an arc slit 12, so that by loosening the screw the disc 13 may be rotated upon the disc 14 by the length of the arc slit.

To the disc 13 is attached a sliding bar 16 having upper and lower grooves 17, 18 parallel to the axial line of the bar. A supporting frame 19 of T-form with horizontal and vertical arms is secured to the sliding bar 16. A set screw 20 at the side, when put in the groove 18, prevents the support frame moving right or left or upwards or downwards. When put in the groove 17 just the opposite position may be secured, i. e. the vertical arm assumes a lower position.

The outer end of the vertical arm is bifurcated and carries an axis fitted with handle 25 and a pinion 26 which engages with a rack attached to the lens tube 29. An arcuate slit 30 is provided in the rack, through which a set screw 31 is passed the latter being secured to the end of the vertical arm. By turning the handle 25 the lens tube can be raised or lowered in a vertical plane and can be secured in any desired position by means of the screw.

On one end of the lens tube a lens 32 is fitted and a filter-screen on the other. The lens is an ordinary convex one. The filter-screen is of a glass plate on one or both sides of which vertical or crossed lines are marked with material which absorbs the heat rays of sunlight. On one end of the lens tube a frame ring is fitted, which carries on its lower part two supporting frames 37 on a support 38 formed by turning upwards its lower end.

The screen cloth 34 has in the upper part so many corners 40 as the number of supporting frames 36, the lower part having a suitable form. At the position held by the support 38 the supporting frame 37 assumes a horizontal position. The screen cloth is held in position by the supporting frames 36, 37, the ends of each of which is inserted in a clip 41 sewed on the cloth. In the centre of the screen cloth a hole is provided to receive the lens tube.

When the apparatus is placed in the sunlight, the rays are thrown on the lens, the other parts being shuttered by the screen cloth. The cloth prevents the direct incidence of light on the parts not affected. The chemical rays from the lens tube may be applied with ease to parts affected. When the rays through lens are directly made to fall on parts affected a burn might be caused which is avoided by the use of absorbing medium of heat rays, so that even at the focus no burn is caused in short time.

As the lens tube can be moved in any direction and be secured at any position whatsoever, it can be easily brought to a position assuming a straight line connecting the sun with the affected parts of the patient.

The apparatus is quite portable, as it occupies only a small volume, when taken to pieces.

Having now fully described the nature of the invention and how it can be applied, what I claim is:—

1. A therapeutic apparatus characterized by a lens tube, on one end of which is a convex lens and on the other end a filter-screen with vertical or crossed lines marked with material capable of absorbing the heat rays of sunlight, said screen transmitting beneficial sun rays where it is not marked with lines the lens tube being fitted with a supporting ring, a screen extending on all sides around the lens tube and said ring carrying a number of supporting frames for the last-mentioned screen, and a movable support for the tube and screen.

2. A therapeutic apparatus characterized by a lens tube, on one end of which is a convex lens and on the other end a filter-screen with vertical or crossed lines marked with material capable of absorbing the heat rays of sunlight, said screen transmitting beneficial sun rays where it is not marked with lines and a movable support for the tube and screen, said lens tube being fitted with a supporting ring, the lower end of which forms a support for horizontal supporting frames.

3. A therapeutic apparatus comprising a tube carrying optical means for the transmission of light rays to a patient, a screen cloth surrounding said tube on all sides and projecting a substantial distance beyond the same in every direction, a frame to which the margin of said cloth is attached, a plurality of arms extending between said frame and said tube to support the frame from the tube, and a support therefor comprising means for vertical adjustment of said tube, means for horizontal swinging adjustment thereof, and means for vertical swinging adjustment thereof.

KINNOSUKE SAWADA.